March 12, 1963 A. M. SPOUND Re. 25,345

AUTOMATIC PROJECTING HEADREST FOR RECLINING CHAIRS

Original Filed Sept. 5, 1957

INVENTOR.
ALBERT M. SPOUND
BY Charles R. Fay,
ATTORNEY

United States Patent Office

Re. 25,345
Reissued Mar. 12, 1963

25,345
AUTOMATIC PROJECTING HEADREST FOR RECLINING CHAIRS

Albert M. Spound, 1561 Old Oak Road, Los Angeles 49, Calif.

Original No. 2,947,347, dated Aug. 2, 1960, Ser. No. 682,142, Sept. 5, 1957. Application for reissue Aug. 10, 1961, Ser. No. 132,263
2 Claims. (Cl. 297—61)

This invention relates to automatic projecting headrests for reclining chairs, and the principal object of the invention resides in the provision of a reclining chair which has a relatively movable headrest associated therewith with mechanism automatically projecting the headrest at the top portion of the backrest of the chair as the backrest is moved to a reclining position; and including mechanism for moving said headrest in a forward direction from its concealed position so as to generally align the head supporting surface of the headrest with the upholstered surface of the back of the chair when the headrest is projected in useful position thereof.

Other objects and advantages of the invention will appear hereinafter.

Reference is to be had to the accompanying drawings, in which

This invention relates to any type of reclining chair having an automatic projected headrest, but for purposes of illustration the same has been shown applied to a conventional type of chair which comprises upholstered side arms 10 having located between them a rigid unit comprising in general an upholstered backrest 12 and an upholstered seat 14.

Figure 1:
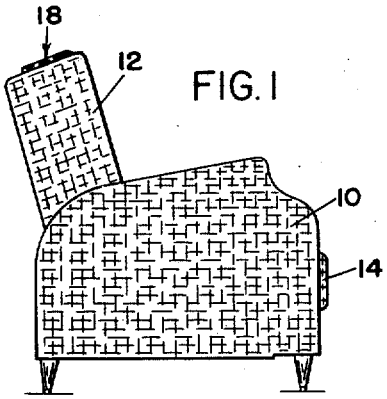
FIG. 1 is a view in side elevation of a chair according to the present invention showing the same in sitting position.
Figure 2:
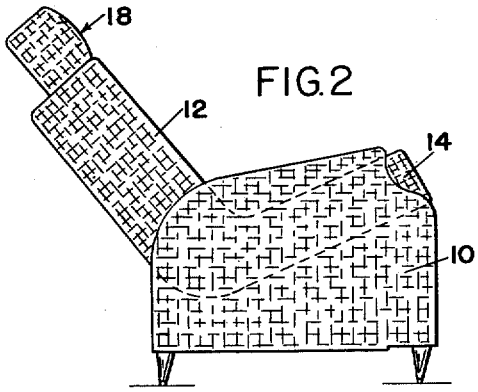
FIG. 2 is a similar view showing the chair in reclining position with the headrest projected.

The backrest and seat are generaly rigidly connected so that they move together as a unit as illustrated in FIGS. 1 and 2, between a sitting and a reclining position; and means of any nature well known in the art may be provided for pivotally mounting the backrest and seat in the frame of the chair as is here conventionally illustrated at 16. This frame of course provides the support for the arms 10, etc.

Figure 3:
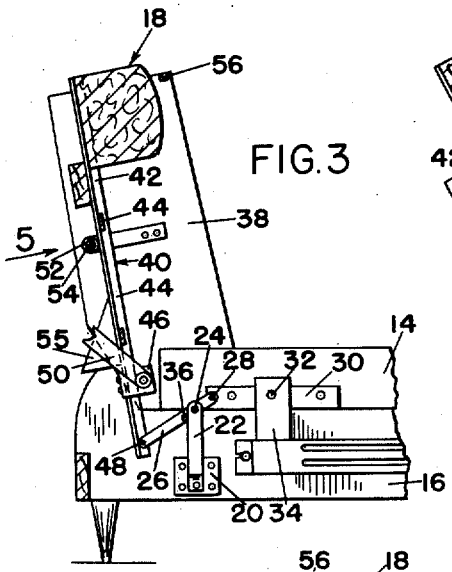
FIG. 3 is a general sectional view through the chair showing the mechanism in the position of FIG. 1.
Figure 4:
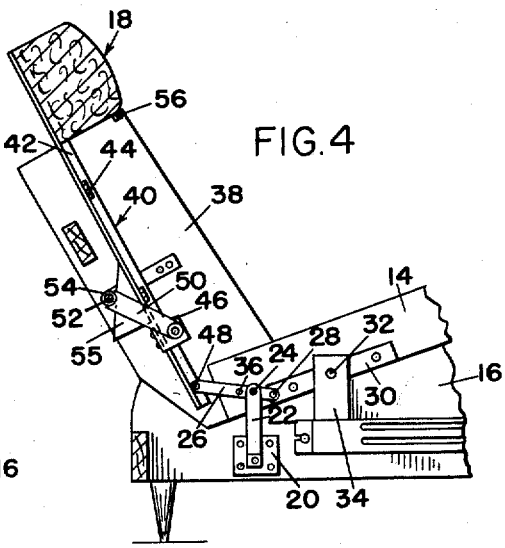
FIG. 4 is a view similar to FIG. 3 showing the mechanism with the headrest projected as in FIG. 2.

The present invention resides in the provision of the headrest generally indicated at 18 which may comprise an upholstered portion as shown; and mechanism is provided for automatically projecting the headrest from a concealed position, FIGS. 1 and 3, when the device is used as a chair, to an exposed projected position for use when the chair is manipulated to place it in reclining position as in FIG. 2 and FIG. 4. This invention includes means for moving the headrest forwardly after it has been projected sufficiently in order to bring the head-supporting surface thereof generally in line with the back-supporting surface of the backrest.

This mechanism preferably comprises a bracket 20 mounting a standard 22 carrying a pivot-pin 24 providing a fulcrum for a link 26. This link is pivoted at one end 28 to a frame member 30 of the seat 14. As shown, the seat 14 may be mounted on a pivot 32 on a standard 34 which is connected to the frame 16 in any way.

It will thus be seen that as seat 14 is moved on pivot

32 in a counter-clockwise direction from the position shown in FIG. 3 to that shown in FIG. 4, the link 26 must be carried in a clockwise direction on its pivot 24. The reference numeral 36 indicates a stop member which limits motion of the lever 26 in a counter-clockwise direction.

Mounted on the frame 38 which is conventionally shown as providing for the upholstered backrest 12, there is a sliding frame generally indicated at 40 and this may comprise a pair of spaced members 42 connected by supporting members 44 movable together in appropriate guide brackets 46, and other convenient guide members may be provided as desired.

Figure 5:
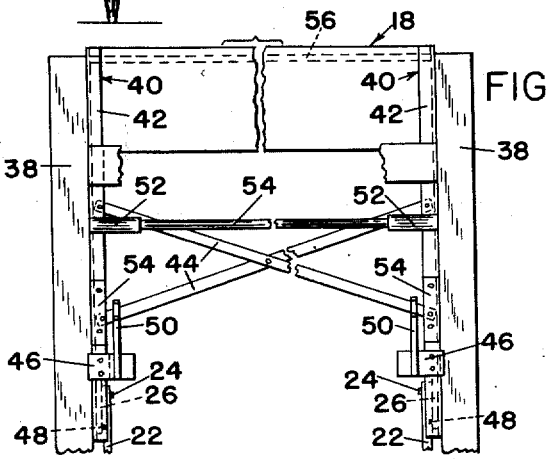
FIG. 5 is an elevational view showing the mechanism and looking in the direction of arrow 5 in FIG. 3, parts being broken away.

The link 26 is pivoted at its end at 48 adjacent the lower end of the member 42, it being recognized that this construction is duplicated at each side of the backrest frame 38, 38 as clearly shown in FIG. 5. In any event, as link 26 rises, i.e., moves clockwise from the position of FIG. 3 to that of FIG. 4, the frame 40 clearly moves upwardly with relation to frame 38, projecting headrest 18 which is secured thereto as clearly shown. In order to prevent an excess motion in this direction, there are provided links 50 pivotally mounted as for instance on brackets 46 to engage stops 52 on a bar 54 mounted in fixed position on the frame members 38 so that the frame 40 may not move any further than is illustrated in FIG. 4.

Appropriately mounted as for instance on members 42 on frame 40, there are provided a pair of cam members which are indicated at 55. These cam members may be in the nature of wedges or the like and in any event provide inclined surfaces as shown which engage the members 52 on the fixed rod 54 as frame 40 moves upwardly. This construction clearly provides that the entire frame 40 together with headrest 18 is moved in a forward direction as in FIGS. 2 and 4 toward the end of the upward motion of the frame 40. This results in a combined upward and forward motion of the headrest 18, but the forward motion thereof does not occur until the headrest is projected upwardly rectilinearly almost to its fullest extent and thereby the headrest is enabled to avoid any obstructions which may be occasioned by the construction or upholstery of the backrest such as is indicated by the reference numeral 56 in FIGS. 3 and 4.

It will be seen that this invention provides a relatively simple construction for automatically operating a concealed headrest member for projecting the same by mechanism operated merely by the relative motion of the parts as the seat is changed from sitting to reclining position, and including means for projecting the headrest forwardly to a certain desired relationship of the parts as described above, and including specifically a position wherein the headrest supporting surface is aligned with the backrest supporting surface.

Having thus described my invention and the advantages thereof, I do not wish to be limited to the details herein disclosed, otherwise than as set forth in the claims, but what I claim is:

1. A reclining chair comprising a stationary frame and a backrest swingably mounted thereon for disposition between sitting and reclining positions thereof, said backrest having a recess therein at the rear portion only thereof, the front surface of said backrest being smooth and continuous and said recess being unobservable from the front, and a headrest movably mounted within said recess from a substantially concealed position of non-use therewithin to an exposed useful position above the backrest, said headrest having a forward head-supporting surface which is substantially continuous with said backrest supporting surface at the forward portion thereof when the headrest is in its upper head-supporting condition, means projecting said headrest from said backrest upon swinging motion of the backrest from a sitting toward a reclining position, and means for moving said headrest forwardly so that it moves from its cavity at the rearward portion of said backrest upwardly and forwardly into useful position as above stated, said means comprising a link pivotally mounted with relation to said stationary frame and connected to and supporting said headrest, said link being slidably mounted upon said backrest and bodily movable relative to the stationary frame, said link being movable in a generally longitudinal direction relative to the backrest upon said swinging motion of the backrest, and inter-engaging cam means on said backrest and said link, said cam means including a wedge having a surface inclined relative to the direction of motion of the link, and a follower to engage the wedge surface, the inclination of the wedge surface being arranged to move said link and headrest bodily forwardly with relation to said backrest at a predetermined point in the motion of the link as it is projected in a longitudinal direction during said swinging motion from a sitting toward a reclining position, said interengaging cam means being spaced apart in the direction of the motion of the link when the headrest is in said substantially concealed position.

2. The reclining chair recited in claim 1 wherein said wedge is mounted directly upon said link extending toward the rear thereof, and the follower is mounted in fixed relation on said backrest for engagement by the inclined surface of the wedge at said predetermined point.

References Cited in the file of this patent or the original patent

UNITED STATES PATENTS

| | | |
|---|---|---|
| 467,756 | Sandburg | Jan. 26, 1892 |
| 711,412 | Archambeault | Oct. 14, 1902 |
| 1,714,696 | Samuelian | May 28, 1929 |
| 1,977,159 | Tursi | Oct. 16, 1934 |
| 2,466,553 | McDonald | Apr. 5, 1949 |
| 2,480,300 | Luketa | Aug. 30, 1949 |
| 2,668,581 | Luketa | Feb. 9, 1954 |
| 2,843,183 | Luckhardt | July 15, 1958 |
| 2,843,184 | Lorenz | July 15, 1958 |